(12) United States Patent
Yan

(10) Patent No.: US 7,643,953 B2
(45) Date of Patent: Jan. 5, 2010

(54) DETERMINATION OF INCREMENTAL VALUE IN SERVER PROCESSED DATA

(75) Inventor: An Yan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 471 days.

(21) Appl. No.: 11/683,123

(22) Filed: Mar. 7, 2007

(65) Prior Publication Data

US 2008/0222229 A1   Sep. 11, 2008

(51) Int. Cl.
*G06F 19/00*   (2006.01)
(52) U.S. Cl. .................................. 702/79; 708/311
(58) Field of Classification Search ............ 702/79, 702/76, 77, 78, 177, 178, 179, 182, 183, 702/185, 188; 708/311
See application file for complete search history.

(56) References Cited

U.S. PATENT DOCUMENTS

| | | | |
|---|---|---|---|
| 5,610,827 A | 3/1997 | Reilly | 364/487 |
| 5,861,616 A | 1/1999 | Fan | 235/462 |
| 5,875,354 A * | 2/1999 | Charlton et al. | 710/61 |
| 6,195,614 B1 | 2/2001 | Kochan | 702/66 |
| 6,347,060 B1 | 2/2002 | Kitayoshi | 365/216 |
| 6,659,958 B2 | 12/2003 | Narimatsu et al. | 600/485 |
| 7,117,118 B2 * | 10/2006 | Kalos et al. | 702/179 |
| 7,146,416 B1 * | 12/2006 | Yoo et al. | 709/224 |
| 2003/0115027 A1 | 6/2003 | Fernandez-Corbaton et al. | 703/2 |
| 2006/0009704 A1 | 1/2006 | Okada et al. | 600/529 |
| 2006/0140484 A1 | 6/2006 | Okochi | 328/207 |
| 2006/0259248 A1 | 11/2006 | Collette et al. | 702/20 |

OTHER PUBLICATIONS

Horowitz, S.L., "A Syntactic Algorithm for Peak Detection in Waveforms with Applications to Cardiography", *Communications of the ACM*, May 1975, 18(5), 281-285.
Raad, M.W. et al., "Novel Peak Detection Algorithms for Pileup Minimization in Gamma Ray Spectroscopy", *Instrumentation and Measurement Technology Conference*, 2006, 2240-2243, Abstract Only, http://ieeexplore.ieee.org.
eXpert™ Peak Detection, Advanced On-board FPGA Technology, www.gage-applied.com, Jul. 24, 2006, 4 pages.
Weimer, M.R., "A Closer Look at the Advanced CODA Peak Capture Algorithm", http://www.dataq.com/applicat/articles/an8.htm, Last Edited May 15, 2006, 5 pages.

* cited by examiner

*Primary Examiner*—Edward Raymond
(74) *Attorney, Agent, or Firm*—Woodcock Washburn LLP

(57) ABSTRACT

The accumulated change in values representative of actions taken by a processor, such as the number of email messages processed by an email server, in a given time period is determined. Actions are represented as data points on a plot. Look-ahead intervals are defined for each point. Candidate pairs of points are determined for each look-ahead interval by comparing the first value in the look-ahead interval with other values in the look-ahead interval. A candidate pair comprises the first point and another point having a lesser value. If a candidate pair has a value therebetween, the candidate pair is discarded. If, however, a candidate pair has no value therebetween, the first value of the candidate pair is a peak value for the look-ahead interval. The accumulated change is determined by calculating the sum of the peak values, plus the final value, minus the initial value, for the given time period.

12 Claims, 5 Drawing Sheets

DETERMINATION OF INCREMENTAL VALUE IN SERVER PROCESSED DATA

TECHNICAL FIELD

The technical field relates generally to computer processing and more specifically to extracting information from server-processed data.

BACKGROUND

It is not uncommon for the owner or administrator of a server to want to determine the accumulated change in the number of events processed by the server in a given time period. For example, an owner of an email service or the owner of a web site may want to determine the number of messages processed by each of its servers over a specific time period, and whether the number increases or decreases, and by how much, over extended time. This information is useful, for example, to facilitate load balancing of the servers and/or o determine the effectiveness of an advertisement on a web site.

This information can be determined by calculating the total (peak) number of events over a period of time and tracking the accumulated peaks. For example, the total number of events (e.g., action taken by a processor, messages processed) since a service started can be calculated. Each time the service is restarted, the total number of events (peak value) is reset to zero. The peak values can then be used to determine the accumulated change in the number of processed events. A typical approach to determining the peak values is to iterate through all data points by time and find the points that have an adjacent neighboring point with a lesser value. This approach can be slow and leads to low performance, especially if the number of data points and number of servers is large. Also, since the data is often saved in a data base, this search approach often leads to low performance query algorithms when the data set is large. Further, the data must be sorted by time before the search. Another common database query technique to solve this issue is to sort the data and add an order ID field. The order ID filed can then be used to group the adjacent points together and compare their values. This approach, however, requires extra space to save the temporary data. It also compares the value of every adjacent data point. This does not scale well for large data sets.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

The accumulated change in values over a given time period is determined by comparing peak values, rather than comparing a value with all possible values within the time period. In an example embodiment, a look-ahead interval is defined for each value in the given time period, and the peak values within the look-ahead intervals are determined. The determined peak values are used to determine the total incremental value for a given time period. When traversing a look-ahead interval in one direction (e.g., left to right), candidate pairs are selected by comparing the first value in the look-ahead interval with other values in the look-ahead interval. For each value found in the look-ahead interval having a lesser value than the first value in the look-ahead interval, a candidate pair is formed. If a candidate pair has a value therebetween, the candidate pair is discarded. If, however, a candidate pair has no value therebetween, the first value of the candidate pair is determined to be a peak value for the look-ahead interval.

BRIEF DESCRIPTION OF THE DRAWINGS

The foregoing summary, as well as the following detailed description, is better understood when read in conjunction with the appended drawings. For the purpose of illustrating the determining incremental values utilizing a look-ahead interval, there is shown in the drawings exemplary constructions thereof, however, determining incremental values utilizing a look-ahead interval is not limited to the specific methods and instrumentalities disclosed.

DETAILED DESCRIPTION OF ILLUSTRATIVE EMBODIMENTS

Figure 1:
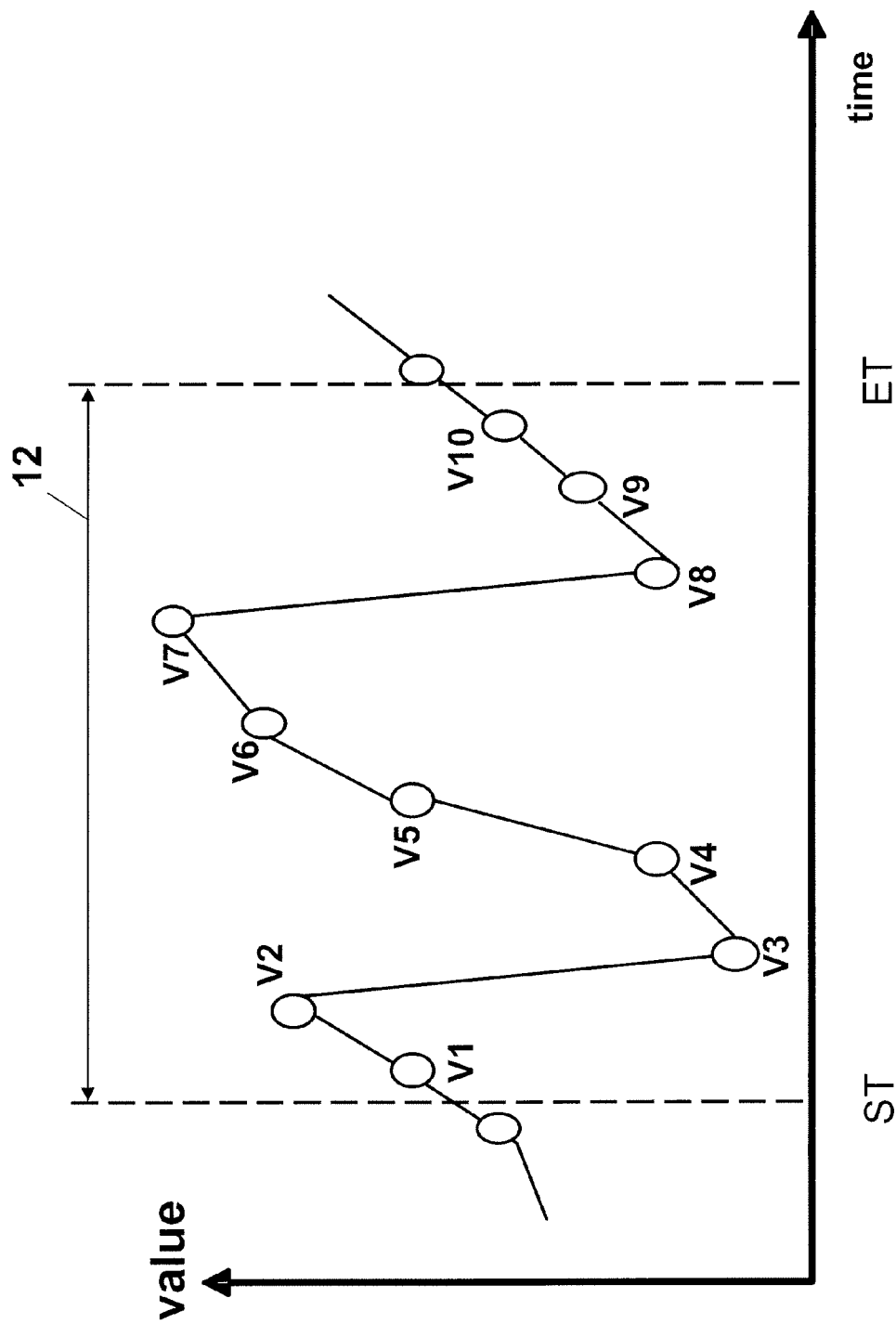
FIG. 1 is an illustration of an example plot of values indicative of a number of server processor events.

FIG. 1 is an illustrative plot of server processed data. Each point, V1, V2, V3, V4, V5, V6, V7, V8, V9, and V10 represents a value indicative of a number of events processed by a server or the like over a time period 12. An event can be any appropriate event, such as processing an email message, receiving an email message, sending an email message, processing web site hits, or the like, for example. It is to be understood that event should not be limited to a specific event type, but that the technique for determining peak points and incremental values is applicable to any appropriate event.

The period of time over which each point is determined can be any appropriate period of time. For example, each of points V1, V2, V3, V4, V5, V6, V7, V8, V9, and V10 can represent a number of events processed during respective periods of time. For illustrative purposes, a service could be an email service. V1 could represent the number of email messages received by the email service during a first time (e.g., one day). V2 could represent the number of email messages received by the service during the first period and a second period of time (e.g., the next day). V3 could represent a number of email messages received by the service during a third period of time (e.g., the third day); and so on. The periods of time do not necessarily have to be equal. For example, V4 could represent the number of email messages received by the service in a week.

The time period 12 over which the incremental value is to be determined is represented by the time interval between the start time (ST) and the end time (ET) shown in FIG. 1. The time period 12 can be any appropriate time period. The accumulated change (increase or decrease) in the value of the data points V1, V2, V3, V4, V5, V6, V7, V8, V9, and V10, is equal to the sum of all peak values in the time period 12, plus the value of the last data point, V10, in the time period 12, minus the value of the initial data point in the time period 12. Thus, as shown in FIG. 1, the accumulated change in value for the time period 12 is V2+V7+V10−V1. A peak value is defined as, when traversing the time period of interest (e.g., time period 12) in one direction (e.g., left to right), a value having a greater value than the value of a contiguous value. For example, as depicted in FIG. 1, traversing the time period 12 from left to right, V2 and V7 are peak values. V2 is a peak value because the contiguous value, V3, is less than V2. V7 is a peak value because the contiguous value, V8, is less than V7.

Figure 2:
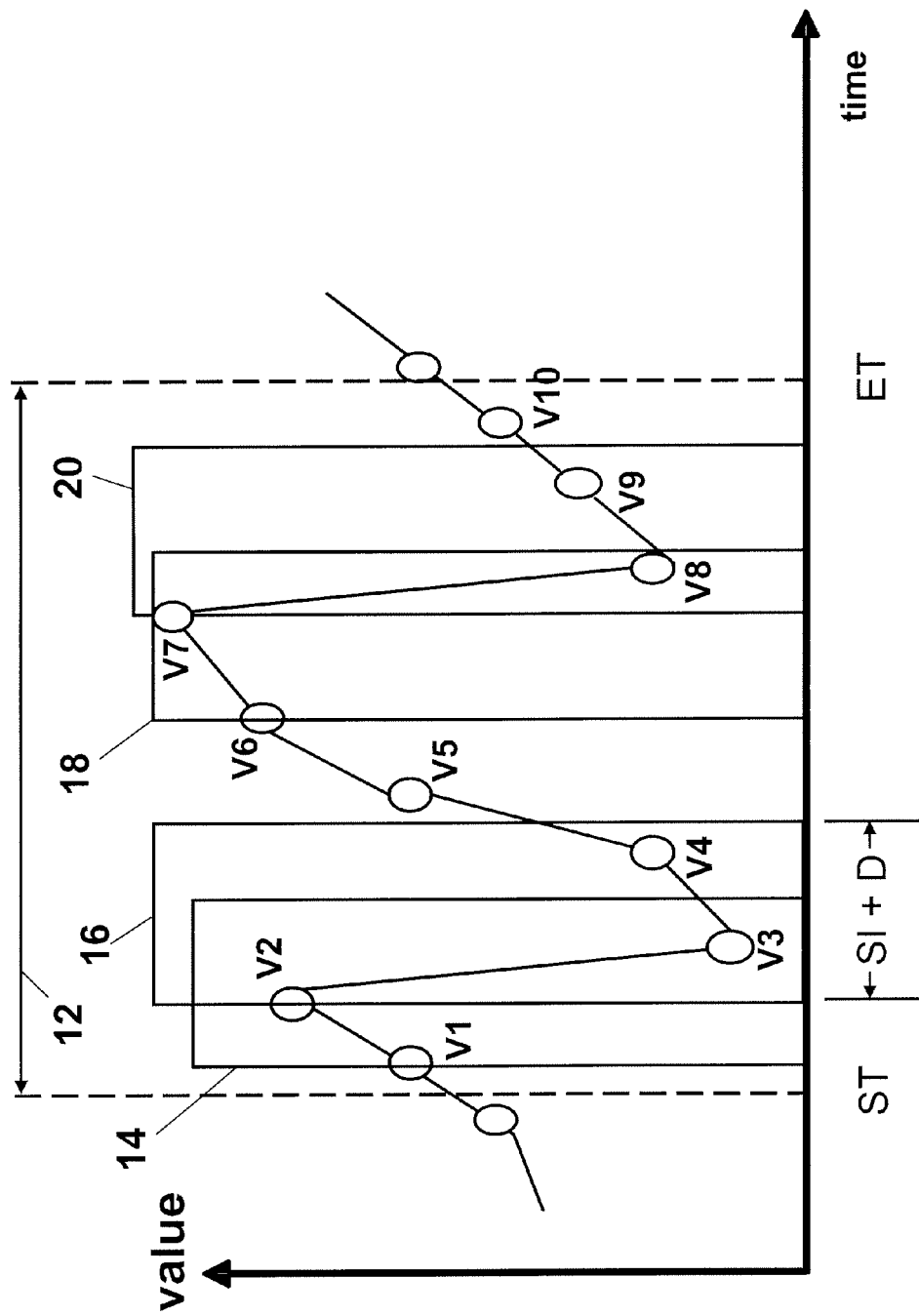
FIG. 2 is a plot of server processed data illustrating example look-ahead intervals.

FIG. 2 is a plot of server processed data illustrating example look-ahead intervals for pint V1, V2, V6, and V7. Look-ahead interval 14 is the look-ahead interval for data point V1. Look-ahead interval 16 is the look-ahead interval for data point V2. Look-ahead interval 18 is the look-ahead interval for data point V6. Look-ahead interval 20 is the look-ahead interval for data point V7. In application, a look-ahead interval could be defined for each data point in a time period. For example, a look-ahead interval could be defined for each of data points V1, V2, V3, V4, V5, V6, V7, V8, V9, and V10. However, for the sake of clarity, look-ahead intervals are shown, in FIG. 2, only for data points V1, V2, V6, and V7.

To determine the accumulated change in the data points in the time period 12, candidate pairs for each look-ahead interval are determined and peak values are obtained from the candidate pairs. To determine a candidate pair of a look-ahead interval, the first data point in a look-ahead interval is compared with each other data point in the look-ahead interval. For each data point having a lesser value than the first data point of the look-ahead interval, a candidate pair of data points is formed. For example, in look-ahead interval 14, V1 is compared to V2 and V3. Comparing V1 with V2, because the value of V2 is greater than the value of V1, V1/V2 is not a candidate pair. Comparing V1 with V3, because the value of V3 is less than the value of V1, V1/V3 is a candidate pair. To determine candidate pairs for the look-ahead interval 16, V2 is compared with V3 and V4. V2/V3 is a candidate pair because the value of V3 is less than the value of V2. Also, V2/V4 is a candidate pair because the value of V4 is less than the value of V2. Performing a similar analysis on the look-ahead interval 18, results in candidate pair V6/V8. And, performing a similar analysis on the look-ahead interval 20, results in candidate pairs V7/V8 and V7/V9.

To obtain peak values from the candidate pairs, each candidate pair is analyzed to determine if a data point exists therebetween. If a data point exists between the data points of a candidate pair, the candidate pair is discarded. If a no data point exists between the data points of a candidate pair, the value of the first data point in the candidate pair is determined to be a peak point. For example, the candidate pairs for time period 12 are: V1/V3, V2/V3, V2/V4, V6/V8, V7/V8, and V7/V9. Analyzing V2/V3, no data point exists between V2 and V3, thus V2 is a peak point. Analyzing V2/V4, V3 exists between V2 and V4, thus the candidate pair V2/V4 is discarded. Analyzing V6/V8, V7 exists between V6 and V8, thus the candidate pair V6/V8 is discarded. Analyzing V7/V8, no data point exists between V7 and V8, thus V7 is a peak point. Analyzing V7/V9, V8 exists between V7 and V9, thus the candidate pair V7/V9 is discarded. Thus, the peak values for the time period 12 are V2 and V7.

As described above, the accumulated change (increase or decrease) in the value of the data points in a time period is equal to the sum of all peak values in the time period, plus the value of the last data point in the time period, minus the value of the initial data point in the time period. Thus, with respect to FIG. 2, the accumulated change in value is the value of V2 plus the value of V7, plus the value of V10, minus the value of V1. (i.e., V2+V7+V10−V1).

Figure 3:
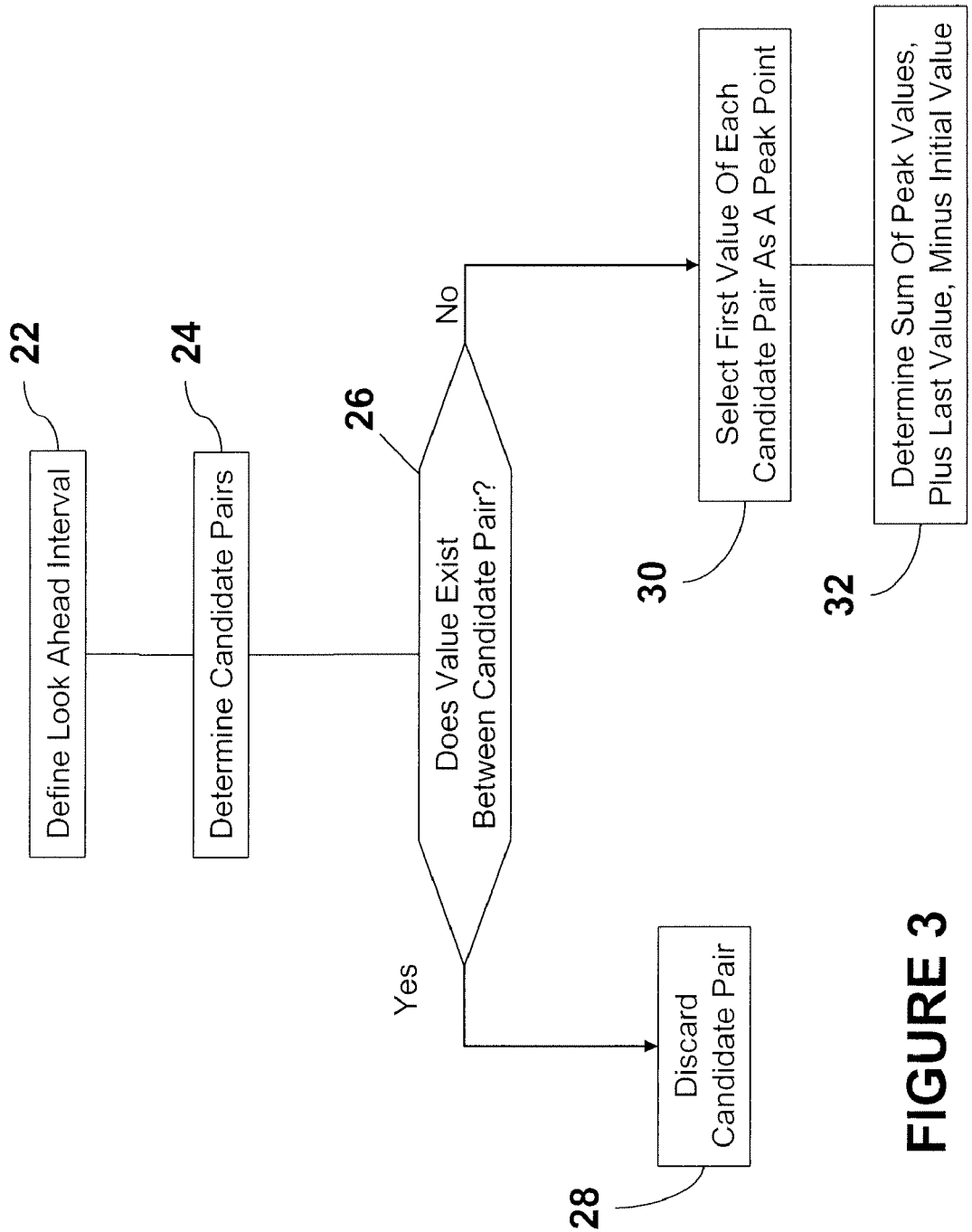
FIG. 3 is a flow diagram of an example process for determining the accumulated change in values occurring in a time period.

FIG. 3 is a flow diagram of an example process for determining the accumulated change in values occurring in a time period, such as the number of events processed by a server, over a time period. At step 22, as described above, a look-ahead interval is defined for each data point in the time period. Each look-ahead interval is analyzed, at step 24, to determine candidate pairs of data points. As described above, the first data point in a look-ahead interval is compared with each other data point in the look-ahead interval, and for each data point having a lesser value than the first data point of the look-ahead interval, a candidate pair of data points is formed. It is determined, at step 26, if a data point exists between each candidate pair. If a data point does exist between the points of a candidate pair, the candidate pair is discarded at step 28. If no data point exists between the points of a candidate pair, the first value of the candidate pair is determined to be a peak value at step 30. At step 32, the accumulated change in values in the time period is determined by calculating the sum of all peak values, plus the value of the last data point in the time period, minus the value of the initial value of the time period.

An example implementation of determining incremental values utilizing a look-ahead interval can be applied to database queries. Below is example SQL code for determining incremental values utilizing a look-ahead interval.

```
SELECT t, v
FROM V as V1
    INNER JOIN V as V2
WHERE
    V1.t >= ST and V1.t < ET AND
    V2.t > ST and V2.t <= ET AND
    V1.v > V2.v AND
    DATEDIFF(SECONDS, V1.t, V2.t) <= LI AND   -- assume LI is
    represented in seconds
    NOT EXISTS
    ( SELECT *
     FROM V as V3
     WHERE V3.t > V1.t and V3.t < V2.t
    )
```

Figure 4:
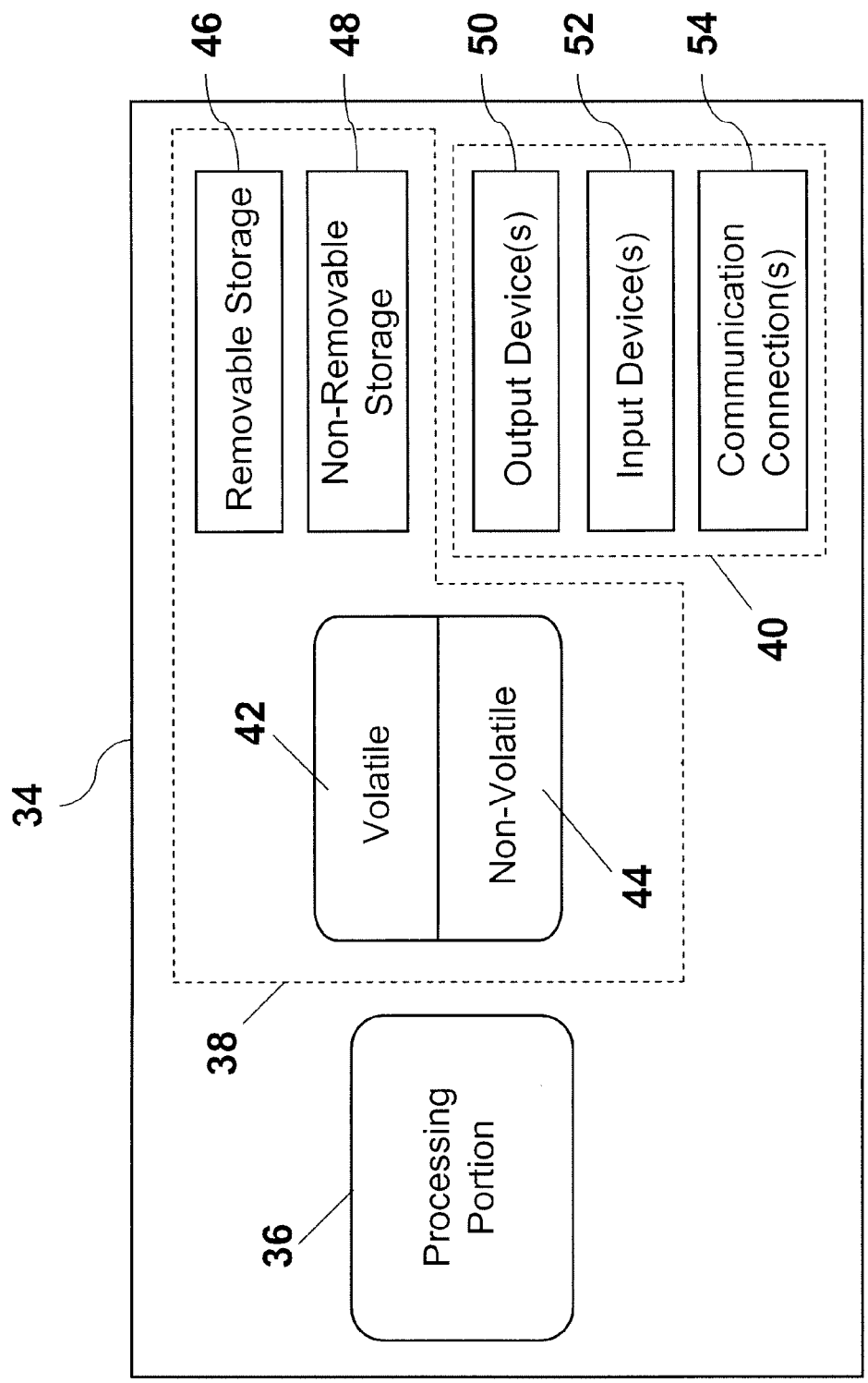
FIG. 4 is a diagram of an exemplary processor for determining an accumulated change in values in a time period.

FIG. 4 is a diagram of an exemplary processor 34 for determining an accumulated change in values in a time period. The processor 34 comprises a processing portion 36, a memory portion 38, and an input/output portion 40. The processing portion 36, memory portion 38, and input/output portion 40 are coupled together (coupling not shown in FIG. 4) to allow communications therebetween. The input/output portion 40 is capable of providing and/or receiving components utilized to determining an accumulated change in values in a time period as described above.

The processing portion 36 is capable of determining an accumulated change in values in a time period as described above. For example, the processing portion 36 is capable of defining a look-ahead interval for each data point in the time period, analyzing look-ahead intervals to determine candidate pairs, comparing data points within a look-ahead interval, determining if points exists between the points of candidate pairs, discarding candidate pairs, selecting the first point of a candidate pair as a peak value, and determining the sum of peak values plus a final value minus an initial value of an look-ahead interval.

The processor 34 can be implemented as a client processor and/or a server processor. In a basic configuration, the processor 34 can include at least one processing portion 36 and memory portion 38. The memory portion 38 can store any information utilized in conjunction with determining the accumulated change in values occurring in a time period.

Depending upon the exact configuration and type of processor, the memory portion 38 can be volatile (such as RAM) 42, non-volatile (such as ROM, flash memory, etc.) 44, or a combination thereof. The processor 34 can have additional features/functionality. For example, the processor 34 can include additional storage (removable storage 46 and/or non-removable storage 48) including, but not limited to, magnetic or optical disks, tape, flash, smart cards or a combination thereof. Computer storage media, such as memory portion 38, 42, 44, 46, and 48, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 34. Any such computer storage media can be part of the processor 34.

The processor 34 can also contain communications connection(s) 56 that allow the processor 34 to communicate with other devices, such as other devices, for example. Communications connection(s) 56 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 34 also can have input device(s) 52 such as keyboard, mouse, pen, voice input device, touch input device, etc. Output device(s) 50 such as a display, speakers, printer, etc. also can be included.

Figure 5:
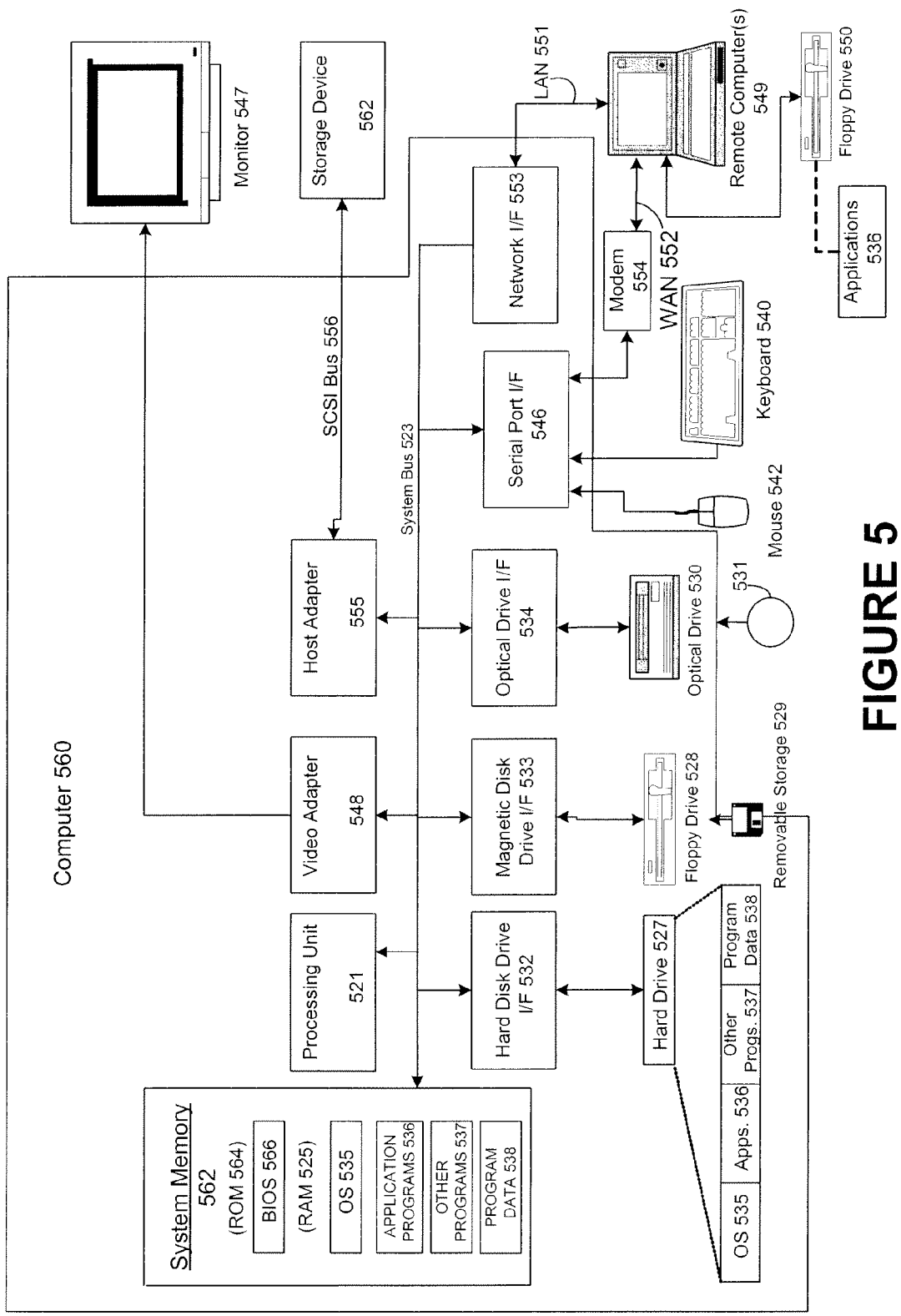
FIG. 5 is a depiction of a suitable computing environment in which determining the accumulated change in values occurring in a time period can be implemented.

FIG. 5 and the following discussion provide a brief general description of a suitable computing environment in which determining the accumulated change in values occurring in a time period can be implemented. Although not required, various aspects of determining the accumulated change in values occurring in a time period can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of determining an accumulated change in values in a time period can be practiced with other computer system configurations, including hand held devices, multi processor systems, microprocessor based or programmable consumer electronics, network PCs, minicomputers, mainframe computers, and the like. Further, determining an accumulated change in values in a time period also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 542, a monitor 547, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with determining the accumulated change in values occurring in a time period as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 5, an exemplary general purpose computing system includes a conventional computing device 560 or the like, including a processing unit 521, a system memory 562, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read only memory (ROM) 564 and random access memory (RAM) 525. A basic input/output system 566 (BIOS), containing basic routines that help to transfer information between elements within the computing device 560, such as during start up, is stored in ROM 564. The computing device 560 may further include a hard disk drive 527 for reading from and writing to a hard disk (hard disk not shown), a magnetic disk drive 528 (e.g., floppy drive) for reading from or writing to a removable magnetic disk 529 (e.g., floppy disk, removal storage), and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non volatile storage of computer readable instructions, data structures, program modules and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 529, optical disk 531, ROM 564, or RAM 525, including an operating system 535, one or more application programs 536, other program modules 537, and program data 538. A user may enter commands and information into the computing device 560 through input devices such as a keyboard 540 and pointing device 542 (e.g., mouse). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, computing devices typically include other peripheral output devices (not shown), such as speakers and printers. The exemplary environment of FIG. 5 also includes a host adapter 555, Small Computer System Interface (SCSI) bus 556, and an external storage device 562 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 5. The logical connections depicted in FIG. 5 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of determining the accumulated change in values occurring in a time period are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing determining the accumulated change in values occurring in a time period, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing determining the accumulated change in values occurring in a time period.

The program(s) can be implemented in assembly or machine language, if desired. In any case, the language can be a compiled or interpreted language, and combined with hardware implementations. The methods and apparatuses for implementing determining the accumulated change in values occurring in a time period also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of determining the accumulated change in values occurring in a time period. Additionally, any storage techniques used in connection with determining the accumulated change in values occurring in a time period can invariably be a combination of hardware and software.

While determining the accumulated change in values occurring in a time period has been described in connection with the example embodiments of the various figures, it is to be understood that other similar embodiments can be used or modifications and additions can be made to the described embodiments for performing the same functions of determining the accumulated change in values occurring in a time period without deviating therefrom. Therefore, determining the accumulated change in values occurring in a time period as described herein should not be limited to any single embodiment, but rather should be construed in breadth and scope in accordance with the appended claims.

What is claimed:

1. A method for determining an accumulated change in value of events occurring within a time period, the method comprising:
    defining a look-ahead interval for each event represented in the time period, wherein an event is indicative of an action taken by a processor;
    determining candidate pairs of events in each look-ahead interval;
    for each candidate pair, determining if an event exists between events in a candidate pair;
    if no event exists between events of a candidate pair, determining that a first value in a respective candidate pair is a peak value; and
    determining a sum of all determined peak values, plus a value of a final event in the time period, minus a value of an initial event in the time period.

2. A method in accordance with claim 1, wherein a candidate pair is determined in accordance with:
    while traversing a look-ahead interval in one direction, comparing a value of a first event in a look-ahead interval with each value of each remaining event in a respective look-ahead interval; and
    for each pair of events being compared, if the value of the first event is greater than a value of a compared event, forming a candidate pair from the first event and the compared event.

3. A method in accordance with claim 1, wherein a period of a look-ahead table is equal to an average sampling period of events in the time period plus an offset.

4. A method in accordance with claim 1, wherein an event is indicative of at least one of processing an email, receiving an email message, providing an email message, and processing a hit on a web site.

5. A processor for determining an accumulated change in value of events occurring within a time period, the processor comprising:
    a processing portion configured to:
        define a look-ahead interval for each event represented in the time period, wherein an event is indicative of an action taken by a processor;
        determine candidate pairs of events in each look-ahead interval;
        for each candidate pair, determine if an event exists between events in a candidate pair;
        if no event exists between events of a candidate pair, determine that a first value in a respective candidate pair is a peak value; and
        determine the accumulate change by calculating a sum of all determined peak values, plus a value of a final event in the time period, minus a value of an initial event in the time period; and
    a memory portion for storing the determined accumulated change.

6. A processor in accordance with claim 5, wherein the processor portion is configured to determine a candidate pair in accordance with:
    while traversing a look-ahead interval in one direction, comparing a value of a first event in a look-ahead interval with each value of each remaining event in a respective look-ahead interval; and
    for each pair of events being compared, if the value of the first event is greater than a value of a compared event, forming a candidate pair from the first event and the compared event.

7. A processor in accordance with claim 5, wherein a period of a look-ahead table is equal to an average sampling period of events in the time period plus an offset.

8. A processor in accordance with claim 5, wherein an event is indicative of at least one of processing an email, receiving an email message, providing an email message, and processing a hit on a web site.

9. A computer-readable medium having stored thereon computer-executable instruction for determining an accumulated change in value of events occurring within a time period, by performing the steps of:
    defining a look-ahead interval for each event represented in the time period, wherein an event is indicative of an action taken by a processor;
    determining candidate pairs of events in each look-ahead interval;
    for each candidate pair, determining if an event exists between events in a candidate pair;
    if no event exists between events of a candidate pair, determining that a first value in a respective candidate pair is a peak value; and
    determining a sum of all determined peak values, plus a value of a final event in the time period, minus a value of an initial event in the time period.

10. A computer-readable medium in accordance with claim 9, the computer-executable instruction for determining a candidate pair in accordance with:
    while traversing a look-ahead interval in one direction, comparing a value of a first event in a look-ahead interval with each value of each remaining event in a respective look-ahead interval; and
    for each pair of events being compared, if the value of the first event is greater than a value of a compared event, forming a candidate pair from the first event and the compared event.

11. A computer-readable medium in accordance with claim 9, wherein a period of a look-ahead table is equal to an average sampling period of events in the time period plus an offset.

12. A computer-readable medium in accordance with claim 9, wherein an event is indicative of at least one of processing an email, receiving an email message, providing an email message, and processing a hit on a web site.

* * * * *